United States Patent [19]
Keller et al.

[11] 3,847,548

[45] Nov. 12, 1974

[54] DUAL TEMPERATURE TRACER METHOD FOR DETERMINING FLUID SATURATIONS IN PETROLEUM RESERVOIRS

[75] Inventors: Theodore E. Keller, Yorba Linda, Calif.

[73] Assignee: Union Oil Company, Los Angeles, Calif.

[22] Filed: Dec. 11, 1972

[21] Appl. No.: 313,687

[52] U.S. Cl. ............................ 23/230 EP, 166/252
[51] Int. Cl. ..................... E21b 43/16, G01n 33/24
[58] Field of Search..... 23/230 EP, 230 R; 166/250, 166/252, 275

[56] References Cited
UNITED STATES PATENTS

| | | | |
|---|---|---|---|
| 3,334,688 | 8/1967 | Blackwell et al. | 166/252 X |
| 3,623,842 | 11/1971 | Deans | 23/230 EP |
| 3,751,226 | 8/1973 | Hesse et al. | 23/230 EP |

Primary Examiner—Robert M. Reese
Attorney, Agent, or Firm—Dean Sandford; Richard C. Hartman; Lannas S. Henderson

[57] ABSTRACT

A method for determining the relative amounts of the fluid phases present in a subterranean petroleum reservoir. A carrier fluid containing (1) at least one tracer that partitions between one of the fluid phases in the reservoir and the carrier fluid to a degree that varies with temperature and (2) at least one tracer material having a partition coefficient that is independent of temperature is injected through a well and placed in the reservoir at a temperature substantially different than the reservoir temperature. The well is shut in for a period sufficient for the injected fluids to come to temperature equilibrium with the reservoir, and the well thereafter returned to production. The produced fluids are analyzed for the presence of the tracer materials, and the fluid saturations determined by applying the principles of chromatography.

17 Claims, No Drawings

DUAL TEMPERATURE TRACER METHOD FOR DETERMINING FLUID SATURATIONS IN PETROLEUM RESERVOIRS

This invention relates to the determination of fluid saturations in permeable subterranean formations, and more particularly to the determination of fluid saturations in a permeable subterranean formation in which at least one of the phases is mobile.

A typical petroleum reservoir is a stratum of rock containing tiny interconnected pore spaces which are saturated with oil, water and/or gas. Knowledge of the relative amounts of these fluids in the formation is essential for the efficient recovery of the petroleum. For example, when a reservoir is first drilled it is necessary to know the original oil and gas saturations to intelligently plan the future exploitation of the reservoir. Also, in the secondary and tertiary recovery of petroleum from depleted reservoirs, the quantity of oil present in the reservoir will often dictate the most efficient manner of conducting the operation and provide an indication of its expected profitability.

There are several methods which are currently used to obtain the fluid saturations of a formation. Coring of the reservoir is one commonly used technique for acquiring this information. Coring is accomplished by drilling into the reservoir and obtaining a sample of the formation rock saturated with its fluids, which is cut from the formation and removed to the surface where its fluid content can be analyzed. This method, however, is susceptible to faults of the sampling technique; thus, the sample taken may not be representative of the formation as a whole. Also, there is a high likelihood that the coring process itself may change the fluid saturation of the extracted core. Moreover, coring can only be employed in newly drilled wells or open hole completions. In the vast majority of wells, casing is set through the oil-bearing formation when the well is initially completed. Core samples, therefore, cannot be subsequently obtained from such a well. Finally, coring by its very nature only investigates the properties of the formation rock and fluids in the core itself, and this data cannot be extrapolated with accuracy to areas of the formation removed from the well.

Another approach for obtaining reservoir fluid saturations is by interpretation of well logs. While this technique is relatively simple and inexpensive to carry out, logging investigates the formation for only a short distance beyond the well bore. Moreover, the logs are a measure of the properties of the rock-fluid system as an entity, and it is difficult by this approach to differentiate between the properties of the rock and its fluids.

Fluid saturations can also be approximated by material balance calculations based on production histories. However, estimates of fluid saturations made by this method are subject to even greater error than coring or logging since the initial fluid saturation must be determined by some other technique and an accurate history of the quantity and source of the produced fluids independently obtained.

U.S. Pat. No. 3,623,842 to Deans proposes a method for measuring fluid saturations in a hydrocarbon-bearing formation containing a mobile fluid and an immobile fluid in which a carrier liquid containing a reactant tracer material is injected into the formation and displaced away from the well. The reactant material is permitted to remain at rest in the formation for a period of time. During this "soak period" at least a part of the reactant reacts to form a product having a different partition coefficient between the carrier fluid and the immobile phase than the reactant material. Subsequently, the carrier fluid, the unconsumed reactant and the reaction product are displaced through the formation, preferably to the injection well by produced fluids. Since the reactant and the product have differing partition coefficients between the mobile and the immobile phases, they are chromatographically retarded in their passage through the formation by different amounts which are a function of the saturation of the immobile fluid phase. By detecting the presence of the reactant and the product in the produced fluids and analyzing these results by chromatographic techniques, the relative proportions of mobile and immobile fluids in the formation can be determined.

While the proposed reacting tracer method overcomes some of the disadvantages of the other known methods for determining fluid saturations, other disadvantages are encountered which adversely affect the accuracy and utility of this method. For example, where the unreacted material is employed as one of the tracers, the method requires the use of a reactant material that is only partially reacted under the reservoir conditions so that both the reactant material and the product are present in the produced fluids in detectable quantities. It is difficult to select a reactant material that exhibits a desired partition coefficient; that only partially reacts under a wide variety of reservoir conditions to form a product having a suitable, but different partition coefficient; and in which both the reactant and the product are present in detectable quantities in the recovered fluids. In order that detectable concentrations of both the reactant and the product materials be obtained, it is often necessary to increase the concentration of the reactant material in the injected carrier liquid. Also, the residence time that the tracer materials are in the reservoir must be carefully controlled to obtain sufficient reaction to provide a detectable concentration of product, yet retain detectable concentrations of reactant. This is difficult and costly to carry out because of the increased chemical usage, difficulty in finding suitable tracers, difficulty in predicting reaction conditions, and because of the careful control of residence or exposure time that is required. Thus, need exists for a simplified, more efficacious method for employing chromatographic principles to determine fluid saturations in a petroleum reservoir.

Accordingly, it is a principle object of this invention to provide a method for measuring fluid saturations in a petroleum reservoir containing at least one mobile fluid phase.

Another object of the invention is to provide a simple, practical, inexpensive method for employing chromatographic techniques to determine the fluid saturations in an oil-bearing formation containing at least one mobile fluid phase.

Still another object of this invention is to provide a method for measuring the water and oil saturations in a petroleum reservoir that has been depleted to essentially residual oil saturation.

Other objects and advantages of the invention will be apparent from the following description.

Briefly, this invention contemplates a method for determining the relative amounts of the fluid phases present in a subterranean formation containing at least one mobile fluid phase. A carrier fluid containing (1) at least one tracer that partitions between one of the fluid phases in the reservoir and the carrier fluid to a degree that varies with temperature and (2) at least one tracer having a partition coefficient that is independent of temperature is injected through a well and placed in the reservoir at a temperature substantially different than the reservoir temperature. The well is shut in for a period sufficient for the injected fluids to come to temperature equilibrium with the reservoir, and the well thereafter returned to production. The produced fluids are analyzed for the presence of the tracer materials, and the fluid saturations determined by applying the principles of chromatography.

It is known that when tracer chemicals are transported through a permeable earth formation by a mobile fluid, the tracers separately move through the earth formation at a velocity that is proportional to the fraction of the tracer in the mobile phase. Thus, a tracer which does not partition, or dissolve, in a second immiscible phase will move through the reservoir at a velocity equal to the velocity of the mobile carrier fluid. A partitioning tracer partitions between the mobile carrier fluid and an immiscible phase present in the reservoir, and the tracer will move through the formation at a slower velocity proportional to the fraction of time that the tracer is dissolved in the mobile phase. Thus, if a solution containing a mixture of partitioning and non-partitioning tracer chemicals is injected into a permeable earth formation through an injection well and transported through the formation to a second well spaced apart from the injection well, the tracer chemicals will be detected in the fluids produced from the second well at different times. The principles of chromatography can be employed to calculate the average saturations of the fluid in that portion of the reservoir contacted by the tracers.

However, this chromatographic effect is reversible when the tracers are transported through the reservoir in a reverse direction. Thus, if a solution containing a mixture of partitioning and nonpartitioning tracer chemicals or of tracer chemicals having different partition coefficients is injected through a well and into the formation surrounding the well, the nonpartitioning tracer will be transported at a higher velocity than the partitioning tracer, and will penetrate further into the formation, the distance of penetration of each partitioning tracer depending in part upon the relative value of the partition coefficient. If the well is then placed on production and the tracers transported back to the well, the chromatographic effect on the velocity of the tracers is of the same order of magnitude as encountered in the injection step and, barring temperature changes or other changes in conditions within the formation, the tracers will arrive at the well at the same time. Since the degree of separation of the tracers within the formation cannot be ascertained from analysis of the recovered fluids, the relative fluid saturations cannot be determined from these results.

The method of this invention utilizes the temperature dependency of the partition coefficient of a partitioning tracer to effect measurement of the fluid saturations by the one well method. The tracers are placed in the formation at a temperature substantially different than the reservoir temperature, and then allowed to attain a different temperature in equilibrium with the temperature of the reservoir. Because of the variation of the partition coefficient of the temperature sensitive partitioning tracer with temperature, the velocity of the tracer through the reservoir during the injection step will be different than its velocity during the production step. Thus, the elution peak of the partitioning tracer will not occur simultaneously with the elution peak of the temperature insensitive tracer. Since the two tracers arrive at the well at different points in the production process, chromatographic principles can be employed to calculate the relative saturations of the fluid phases.

In its broadest application, the method of this invention can be employed to measure the saturations of fluids in any permeable formation containing at least one mobile fluid phase. Thus, the formation can contain mobile oil, gas and water phases, or one or more of these phases may not be present, or may be at residual saturation. The method has particular application to the measurement of oil and water saturations in the absence of a free gas phase. In these applications, both mobile oil and water can be present, or either the water or the oil can be at residual saturation. The method is especially adapted to the measurement of oil and water saturations in reservoirs containing only residual oil an no free gas phase.

The selection of the carrier fluid, the temperature sensitive partitioning tracer and the temperature insensitive tracer is dependent upon the particular fluids present in the reservoir, and the particular saturation measurements desired. The carrier fluid may be either a liquid or a gas so long as it is miscible with one of the mobile fluid phases present in the reservoir. Thus, where a free gas phase is present, the carrier fluid can be a gas; in the case where mobile oil is present, the carrier fluid can be an oil; and in the case where mobile water is present, the carrier fluid can be water or brine. Since most producing oil wells produce both oil and water, whether or not a free gas phase is present, it is preferred in many instances to employ water or brine, such as previously produced oil field brine, as the carrier fluid.

In practicing the method of this invention, a heat exchange fluid that is miscible with at least one mobile phase present in the reservoir is injected through a well and into the reservoir at a temperature substantially different than the reservoir temperature and in an amount sufficient to heat or cool that portion of the reservoir to be tested to a temperature about equal to the temperature of the injected fluid. Next, the carrier fluid containing the tracer chemicals is injected through the well and into the reservoir at the same temperature as the heat exchange fluid. The tracer-containing carrier fluid is then displaced into the reservoir by a subsequently injected fluid miscible with the carrier fluid and at the same temperature as the carrier fluid. The well is then shut in for a time period sufficient for the injected fluids to attain a substantially different temperature in equilibrium with the reservoir temperature. The well is then placed on production and the recovered fluids tested for the presence of the tracer chemicals.

In the case of reservoirs at or near depletion, where essentially only water is being produced, the heat exchange fluid and the carrier fluid are preferably water or brine. Thereafter, an additional quantity of water is injected to displace the tracer solution outwardly into the formation away from the well. Similarly, where only oil is being produced with little or no water, the oil can be employed as the heat exchange fluid, the carrier fluid, and for displacing the tracer solution into the formation. However, in those reservoirs producing substantial quantities of water along with the oil, it is preferred to inject both oil and water through the well and into the reservoir in the same proportion as normally produced by the particular strata being tested, thereby preventing changes in the fluid saturations in the strata contacted by the tracers. Thus, for example, where the producing water/oil ratio of a well or of the particular strata to be tested is 4, both oil and water are simultaneously injected through the well and into the reservoir in the proportion of 4 parts of water per part of oil. The tracer chemicals can be injected in either oil or water and the tracer solution injected simultaneously with the other immiscible fluid at the same water/oil ratio. Thereafter, water and oil are again injected in these proportions to displace the tracer solution into the formation away from the well. Where a free gas phase is present in the strata to be tested, it is preferred that gas also be injected along with the other fluid phases in the same proportion as present during the normal production of the well.

The relative solubility of a tracer between two immiscible fluid phases can be predicted by the partition coefficient, which is expressed by the following relationship:

$$K_A = C_{Ai}/C_{Am} \quad (1)$$

wherein:
$K_A$ is the partition coefficient of tracer A between a given mobile phase and a second immiscible phase at a specified temperature;
$C_{Ai}$ is the concentration of tracer A in the second immiscible phase; and
$C_{Am}$ is the concentration of tracer A in the mobile phase.

The partition coefficient for any tracer between two immiscible fluids will depend upon the particular immiscible fluids involved and the temperature. Theoretically, the partition coefficient of any tracer will vary between 0 for a tracer that is completely insoluble in the immiscible phase to infinity for a tracer that is insoluble in the mobile phase. A partition coefficient of 1 signifies that the tracer is equally soluble in the mobile phase and in the immiscible phase.

The partitioning tracer can be any radioactive or chemical tracer material that partitions under reservoir conditions between the carrier fluid and an immiscible fluid in the reservoir, and that does not react in the reservoir in an amount that reduces its concentration below detectable levels or adsorb upon the reservoir rock to an appreciable extent. Preferably, the partition coefficient exhibits at least about a two fold change in value over the temperature range involved. For example, in the case where the partitioning tracer is injected in an aqueous carrier fluid, if the partitioning tracer exhibited a partition coefficient of 5 at the injection temperature, it is preferred that it exhibit a partition coefficient of at least about 10 at the equilibrium temperature during the production step.

In oil-water systems, i.e., where either oil or water is the carrier fluid and the other of these fluids is the immiscible reservoir fluid, suitable partitioning tracers include various oil- and water-soluble organic materials such as alkyl, aryl, and alicyclic esters, ethers, alcohols, aldehydes, ketones, phenols and amines. Preferred oil- and water-soluble organic partitioning agents include alkyl esters containing about 3 to 11 carbon atoms, exemplary of which are ethyl formate, ethyl acetate, propyl acetate, butyl acetate, ethyl propionate, propyl propionate, butyl propionate, and the like; aliphatic alcohols containing about 3 to 7 carbon atoms, such as propyl alcohol, butyl alcohol, pentyl alcohol, hexyl alcohol, heptyl alcohol and their isomers; and amines containing about 3 to 7 carbon atoms such as propyl amine, methylethyl amine, diethylpropyl amine, methyldipropyl amine, n-hexyl amine, and the like.

The partition coefficient of a tracer chemical between oil and water can be measured at any desired temperature by the following technique:

1. A known concentration of tracer is dissolved in the aqueous phase. 2. A known volume of the aqueous tracer solution is introduced into a suitable container such as a glass or steel bomb along with an equal volume of oleic phase.
3. This mixture is agitated for 1 hour at the test temperature to allow the tracer to reach an equilibrium distribution between the oleic and aqueous phases.
4. The two phases are allowed to separate and the aqueous phase analyzed to determine the concentration of tracer present.
5. The partition coefficient is calculated by the following equation:

$$K = C_c/C_p - 1 \quad (2)$$

where
$K$ is the partition coefficient for the tracer tested at the test temperature;
$C_c$ is the concentration of the tracer in the initial aqueous solution charged; and
$C_p$ is the equilibrium concentration of the tracer in the aqueous phase.

The partition coefficient for any particular partitioning tracer depends upon the properties of the two fluid phases between which it is distributed and the temperature. Partition coefficients between a 35° API Texas crude oil and synthetic brine containing 9.4 weight percent dissolved solids for various exemplary partitioning tracers at temperatures of 75° F. and 150° F. are listed in Table 1.

TABLE 1

EXEMPLARY PARTITIONING COEFFICIENTS

| Tracer | Partition Coefficient Between Crude Oil and Brine | |
|---|---|---|
| | at 75° F. | at 150° F. |
| Ethyl acetate | 3.4 | 6.6 |
| n-Hexylamine | 0.9 | 2.1 |
| n-Hexyl alcohol | 9.3 | 24 |

The temperature insensitive tracer, i.e., the tracer having a partition coefficient that is independent of temperature, can be any radioactive or chemical tracer material that is soluble in or miscible with the carrier fluid and which has a partition coefficient that does not vary appreciably with temperature over the range encountered, that does not react in the reservoir in an amount that reduces its concentration below detectable levels, and that is not appreciably adsorbed by the reservoir rock. Where an aqueous liquid is employed as the carrier liquid, suitable temperature insensitive tracer materials include tritium, methyl alcohol, ethyl alcohol, ammonium thiocyanate, water-soluble aldehydes, water-soluble iodide salt, water-soluble salicylate such as the ammonium and alkali metal salts of salicylic acid, alkali metal and ammonium nitrates, and the like. Where the carrier fluid is an oleaginous liquid, suitable tracers include oil-soluble alcohols, aldehydes and radioactive alkanes. Although the tracer material must be soluble in the carrier fluid, insolubility in the immiscible phase contacted in the reservoir is not a critical property and tracer materials that partition between the carrier fluid and the immiscible phases contacted in the reservoir can be employed so long as the partition coefficient does not vary to any appreciable extent with temperature. Since the degree to which temperature insensitive tracers partition into the immiscible reservoir fluid is independent of temperature, their transport velocity through the formation will not be affected by temperature.

The temperature sensitive partitioning tracer and the temperature insensitive tracer are employed in dilute concentrations, i.e., at concentrations low enough to be in the range that the partition coefficients are linear, that avoid chromatographic overloading, and that do not appreciably increase the volume of the fluid phase into which it partitions. Typically, where chemical tracers are used the tracers can be employed at concentrations of less than about 3 weight percent, and more preferably at about 100 ppm to 10,000 ppm. Where radioactive tracers are employed, the tracer material should be injected in an amount sufficient to provide about 0.1 to 2 Curies of radiation.

The volume of carrier fluid containing the temperature sensitive and temperature insensitive tracers that is injected into the reservoir should be the smallest volume that provides a detectable peak in the elution profile. The minimum slug size depends upon the degree of dispersion in the formation. An elution profile having a sharp peak provides maximum accuracy. Injection of an excessive volume of tracer solution causes broad, flat peaks in the elution profile that are difficult to interpret accurately. In most instances, satisfactory results can be obtained by injecting a volume of tracer-containing carrier fluid equivalent to between about 0.01 and 0.5 pore volume of that portion of the formation to be contacted. After injection of the tracer-containing fluid, an additional quantity of tracer-free fluid is injected to displace the tracer-containing fluid outwardly into the formation a desired distance, which is preferably equivalent to a uniform cylinder having a radius of from about 5 to 50 feet.

The relative saturations of oil and water in a reservoir containing only residual oil and no free gas can be calculated from the following equations:

$$S_o/S_w = V_B - V_A/K_{B_p} V_A - K_{B_i} V_B \quad (3)$$

$$S_o + S_w = 1 \quad (4)$$

wherein $S$ is the fluid saturation in the porous formation expressed as a decimal fraction;

$V$ is the volume of the mobile phase produced at tracer peak arrival;

$K$ is the partition coefficient as previously defined;

and in the subscripts $A$ refers to the non-partitioning tracer;

$B$ refers to the partitioning tracer;

$i$ refers to conditions of injection temperature; and $P$ refers to conditions of equilibrium reservoir temperature.

Where a mobile oil phase is present, equation 3 can be modified as follows:

$$S_o/S_w = V_B - V_A(MO)/K_{B_p} V_A(MO) - K_{B_i} V_B \quad (5)$$

where the term MO is a correction factor for the mobile oil, and is determined by the following relationship:

$$MO = (Q_o/Q_w)K_A + 1/(Q_o/Q_w)K_B + 1 \quad (6)$$

and wherein $Q$ is the volumetric flow rate of a designated fluid.

These calculation techniques assume that no free gas is present. However, the presence of a free gas phase is not detrimental to the practice of the invention and, in fact, the gas saturation of the formation can also be determined by this method.

In a preferred mode of practicing the invention to determine the relative oil and water saturations in an oil reservoir containing only residual oil with essentially no mobile oil, water or brine at a temperature at least about 50° F. different than the temperature of the strata to be tested is injected through a well and into these strata in an amount sufficient to adjust the temperature of these strata to the temperature of the injection water. Next, about 0.01 to 0.5 pore volume of an aqueous tracer solution prepared by dissolving from about 100 to 10,000 ppm each of a selected partitioning temperature sensitive tracer and a nonpartitioning temperature insensitive tracer in water or brine is injected through the well and into the formation. An additional quantity of tracer-free water or brine is then injected to displace the tracer solution outwardly into the reservoir a distance of about 5 to 50 feet. The tracer solution and the displacing fluid are injected at the same temperature as the previously injected heat exchange fluid. The well is shut in for a soak period to allow time for the injected fluids to attain a temperature equilibrium with the reservoir, which in most cases will be a temperature equal to the reservoir temperature. After temperature equilibrium is attained, the well is returned to production and the produced water analyzed for the presence of the partitioning tracer and the marker tracer. This preferred mode can also be employed in reservoirs having mobile oil. However, it is preferred in this case to inject oil simultaneously with the heat exchange fluid, the tracer solution, and with the displacing brine in the same proportion as the oil and water are produced from these strata.

The invention is further described by the following example which is illustrative of one specific mode of practicing the invention as defined by the appended claims.

This example illustrates the practice of the method of this invention to measure the oil saturation of a watered-out petroleum reservoir, such as a petroleum reservoir that has been reduced to residual oil saturation by waterflooding. In such case, a well penetrating the oil-bearing strata would produce only water, with little or no oil being produced. As a first step in the method of this invention, approximately 2,000 barrels of brine previously recovered from the formation is injected through the well to be tested and into the producing strata at a temperature of 75° to cool the strata to be tested from its normal temperature of 150° F. to about 75° F. About 5,000 ppm each of ethyl acetate, a tracer that partitions between the brine and oil contacted in the reservoir, and ammonium thiocyanate, a nonpartitioning tracer soluble in brine, are dissolved in the brine. Approximately 500 barrels of this solution is injected through the well and into the reservoir at a temperature of 75° F., and the injected solution displaced away from the injection well by the subsequent injection of 1,250 barrels of brine, also at a temperature of 75° F.

The well is shut in for about 30 days to allow the injected fluids to be heated by the surrounding reservoir to the reservoir temperature of 150° F. The well is then returned to production in conventional manner, and the produced water analyzed for the presence of ethyl acetate and ammonium thiocyanate. The elution peak for the ammonium thiocyanate is observed after the production of 1,500 barrels of water, and the ethyl acetate peak after the production of 2,000 barrels of water. The average oil saturation of the strata is calculated as follows:

$$S_o/S_w = V_B - V_A/K_{B_p} V_A - K_{Bi} V_B = 2,000 - 1,500/6.6(1,500) - 3.4(2,000) = 0.161 \text{ pore volume}$$

$$S_o = 0.139 \text{ pore volume}$$

While particular embodiments of the invention have been described, it will be understood, of course, that the invention can be modified and it is intended to include within the invention such modifications as are within the scope of the claims.

The invention having thus been described, I claim:

1. A method for measuring the relative amounts of immiscible fluid phases present in a subterranean formation penetrated by a well in communication therewith and containing at least one mobile fluid phase, which comprises:

injecting a heat exchange fluid at a temperature substantially different than the temperature of the formation to adjust the temperature of the strata to be tested to about that of the injected fluids;

thereafter injecting a carrier fluid through said well and into said formation at the temperature of the injected heat exchange fluid, said carrier fluid being miscible with said mobile fluid and containing a low concentration of (1) at least one first tracer material that partitions between one of the fluid phases in the formation and the carrier fluid to a degree that varies with temperature and (2) at least one second tracer material having a partition coefficient that is independent of temperature;

shutting in said well for a time period sufficient for the injected fluids to come to temperature equilibrium with the formation;

producing said well to recover fluids from said formation;

analyzing said recovered fluids to determine the peak concentrations of said tracer materials in said fluids; and applying chromatographic principles to determine the relative saturation of fluid phases present in said formation.

2. The method defined in claim 1 wherein said tracer-containing carrier fluid is displaced into the formation by the subsequent injection of a tracer-free fluid miscible with said carrier fluid, said subsequently injected fluid being at the same temperature as the heat exchange fluid.

3. The method defined in claim 1 wherein said carrier fluid is an aqueous liquid and wherein said second tracer material is soluble in water and insoluble in oil.

4. The method defined in claim 1 wherein said carrier fluid is an oleaginous liquid and wherein said second tracer is soluble in oil and insoluble in water.

5. A method for measuring the relative saturations of oil and water present in a subterranean formation penetrated by a well in communication therewith and containing at least one mobile oil or water phase, which comprises:

injecting a heat exchange fluid through the well and into the formation at a temperature at least about 50° F. different than the temperature of the formation and in an amount sufficient to adjust the temperature of that region of the formation to be tested to about the temperature of the injected fluid;

next injecting a carrier fluid through said well and into said formation at the same temperature as said heat exchange fluid, said carrier fluid being miscible with said mobile fluid and containing a low concentration of (1) at least one first tracer material that partitions between one of the fluid phases in the formation and the carrier fluid to a degree that varies with temperature and (2) at least one second tracer material having a partition coefficient that is independent of temperature;

displacing said carrier fluid into said formation away from the well by injecting through the well and into the formation a displacing fluid miscible with said carrier fluid and at the same temperature as said carrier fluid;

shutting in said well for a time period sufficient for the injected fluids to come to temperature equilibrium with the formation;

producing said well to recover fluids from said formation;

analyzing said recovered fluids to determine the peak concentrations of said tracer materials in said fluids; and applying chromatographic principles to determine the relative saturation of fluid phases present in said formation.

6. The method defined in claim 5 wherein water and oil are both produced from the well prior to the injection of said heat exchange fluid, wherein said heat exchange fluid is a mixture of water and oil in the same proportions as said fluids are produced, wherein said carrier fluid is miscible with either the water or the oil is injected simultaneously with a mixture of water and oil in the same proportions as said fluids are produced, and wherein said displacing fluid is a mixture of water and oil in the same proportions as said fluids are produced.

7. The method defined in claim 5 wherein mobile oil is present in said formation, and said carrier fluid is an oleaginous liquid miscible therewith.

8. The method defined in claim 7 wherein said second tracer material is soluble in oil and insoluble in water.

9. The method defined in claim 5 wherein mobile water is present in said formation, and said carrier fluid is an aqueous liquid.

10. The method defined in claim 9 wherein said second tracer material is soluble in water and insoluble in oil.

11. A method for measuring the relative saturations of oil and water present in a subterranean formation penetrated by a well in communication therewith and containing a mobile water phase and an immobile oil phase, which comprises:
  injecting an aqueous liquid heat exchange fluid through the well and into the formation at a temperature at least about 50° F. different than the temperature of the formation and in an amount sufficient to adjust the temperature of that region of the formation to be tested to about the temperature of the injected fluid;
  next injecting an aqueous liquid carrier fluid through said well and into said formation at the same temperature as said heat exchange fluid, said carrier fluid being miscible with said mobile fluid and containing a low concentration of (1) at least one first tracer material that partitions between one of the fluid phases in the formation and the carrier fluid to a degree that varies with temperature and (2) at least one second tracer material having a partition coefficient that is independent of temperature;
  displacing said carrier fluid into said formation away from the well by injecting an aqueous liquid displacing fluid through said well and into the formation at the same temperature as the heat exchange fluid;
  shutting in said well for a time period sufficient for the injected fluids to come to temperature equilibrium with the formation;
  producing said well to recover water from said formation;
  analyzing the produced water to determine the peak concentrations of said first and said second tracer materials in said produced water; and
  applying chromatographic principles to determine the relative saturation of oil and water present in said formation.

12. The method defined in claim 11 wherein said second tracer material is soluble in water and insoluble in oil.

13. A method for measuring the relative amounts of immiscible fluid phases present in a subterranean formation penetrated by a well in communication therewith and containing at least one mobile fluid phase, which comprises:
  injecting a carrier fluid through said well and placing said carrier fluid in said formation at a temperature at least 50° F. different than the temperature of the formation, said carrier fluid being miscible with said mobile fluid and containing a low concentration of (1) at least one first tracer material that partitions between one of the fluid phases in the formation and the carrier fluid to a degree that varies with temperature and (2) at least one second tracer material having a partition coefficient that is independent of temperature;
  shutting in said well for a time period sufficient for the injected fluids to come to temperature equilibrium with the formation;
  producing said well to recover fluids from said formation;
  analyzing said recovered fluids to determine the peak concentrations of said tracer materials in said fluids; and
  applying chromatographic principles to determine the relative saturation of fluid phases present in said formation.

14. The method defined in claim 13 wherein said tracer-containing carrier fluid is displaced into the formation by the subsequent injection of a tracer-free fluid miscible with said carrier fluid, said subsequently injected fluid being at the same temperature as the tracer-containing carrier fluid.

15. The method defined in claim 13 wherein said carrier fluid is an aqueous liquid and wherein said second tracer material is soluble in water and insoluble in oil.

16. The method defined in claim 13 wherein said carrier fluid is an oleaginous liquid and wherein said second tracer is soluble in oil and insoluble in water.

17. A method for measuring the relative amounts of immiscible fluid phases present in a subterranean formation penetrated by a well in communication therewith and containing at least one mobile fluid phase, which comprises:
  injecting a heat exchange fluid through the well and into the formation at a temperature at least about 50° F. different than the temperature of the formation and in an amount sufficient to adjust the temperature of that region of the formation to be tested to about the temperature of the injected fluid;
  next injecting a carrier fluid through said well and into said formation at the same temperature as said heat exchange fluid, said carrier fluid being miscible with said mobile fluid and containing a low concentration of (1) at least one first tracer material that partitions between one of the fluid phases in the formation and the carrier fluid to a degree that varies with temperature and (2) at least one second tracer material having a partition coefficient that is independent of temperature, the concentration of each tracer material being between about 100 ppm and 10,000 ppm if nonradioactive and if radioactive such as to provide between about 0.1 to 2 Curies of radiation;
  injecting a displacement fluid through said well and into said formation to displace said carrier fluid into said formation an average distance of about 5 to 50 feet from said well;
  shutting in said well for a time period sufficient for the injected fluids to come to temperature equilibrium with the formation;
  producing said well to recover fluids from said formation;
  analyzing said recovered fluids to determine the peak concentrations of said tracer materials in said fluids; and
  applying chromatographic principles to determine the relative saturation of fluid phases present in said formation.

* * * * *

UNITED STATES PATENT OFFICE
CERTIFICATE OF CORRECTION

Patent No. 3,847,548          Dated November 12, 1974

Inventor(s) THEODORE E. KELLER

It is certified that error appears in the above-identified patent and that said Letters Patent are hereby corrected as shown below:

In claim 6, column 10, line 65 the word --and-- should be inserted between the word "oil" and the phrase "is injected".

Signed and sealed this 4th day of February 1975.

(SEAL)
Attest:

McCOY M. GIBSON JR.         C. MARSHALL DANN
Attesting Officer          Commissioner of Patents